Aug. 19, 1958   J. L. QUICK   2,847,924
TINE FOR POWER DRIVEN TILLER
Filed Nov. 9, 1954   2 Sheets-Sheet 1
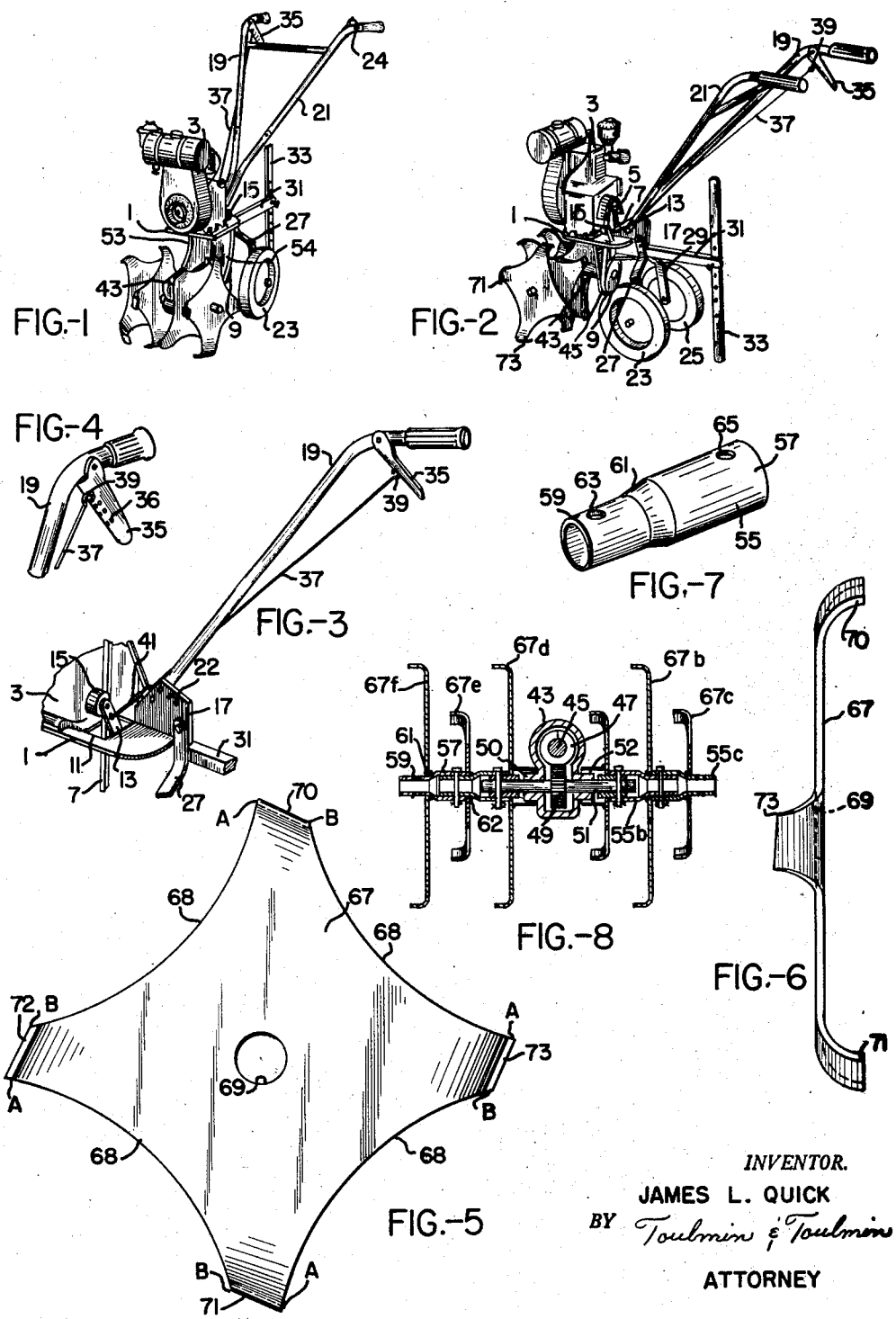
INVENTOR.
JAMES L. QUICK
BY Toulmin & Toulmin
ATTORNEY

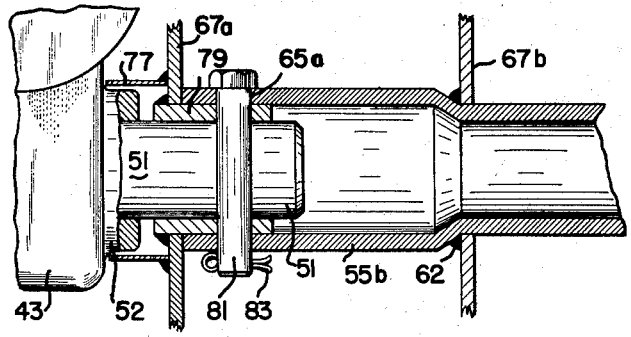
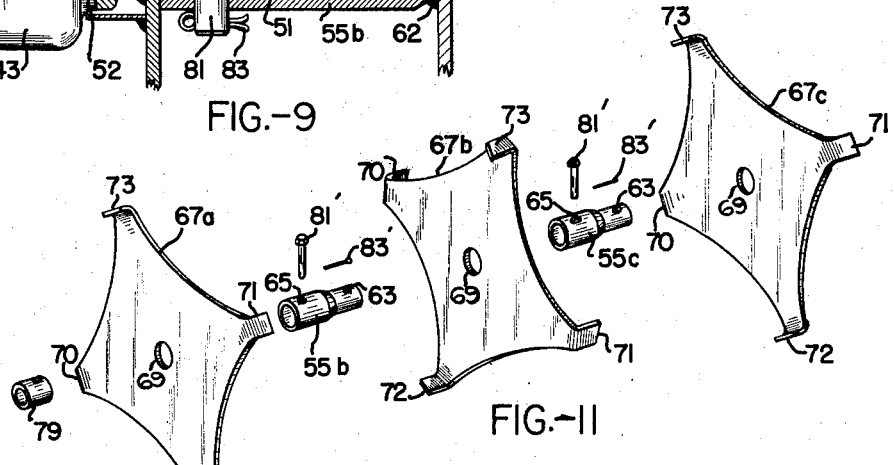
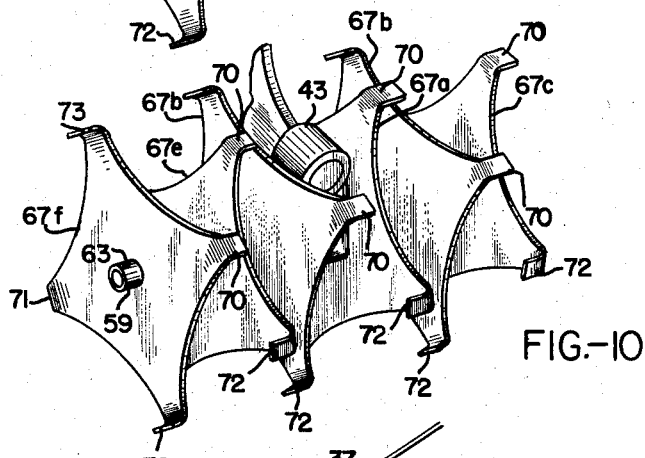
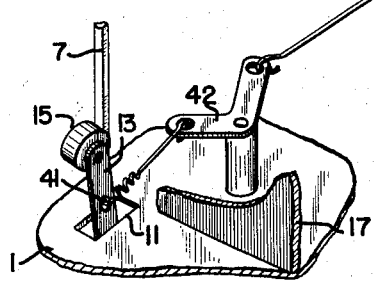

United States Patent Office 2,847,924
Patented Aug. 19, 1958

2,847,924

TINE FOR POWER DRIVEN TILLER

James L. Quick, Springfield, Ohio, assignor to Quick Manufacturing, Inc., Springfield, Ohio, a corporation of Ohio Application November 9, 1954, Serial No. 467,682

6 Claims. (Cl. 97—217)

This invention relates to powered grounds-working equipment and is particularly concerned with rotary tillers and tine constructions therefor.

In the planting of flowers, vegetables and a wide variety of crops common to small acreages, it is customary to employ different center-to-center spacings for the rows of crops, the particular center spacing being dependent upon the particular product under cultivation. To facilitate the tilling of the soil it is highly desirable that the tilling equipment be adapted to pass through the center spacings without damage to the growing vegetation. Further, it frequently occurs, particularly with respect to flower beds, that it is necessary to approach closely to the growing material in order to effect the tilling operation satisfactorily.

It is a primary object of this invention to describe novel grounds-tending equipment which provides means for the advancing of the apparatus directly up to the growing product in such manner that complete working of the ground is assured without the causing of damage to the product.

It is an important object of this invention to provide a novel structure of tilling tine.

It is a principal object of the invention to describe a novel arrangement of tines such that the tines may be demountably secured on a tiller and positioned to substantially any desired width, within very minor limits, for effective working of the soil.

Other further objects, advantages and features of construction of the invention will be apparent from the following detailed description and accompanying drawings wherein:

Figure 1 is a perspective view, taken from a forward position, of a powered rotary tiller embodying the principles of this invention;

Figure 2 is a perspective view of the apparatus of Figure 1 taken from a rearward end thereof;

Figure 3 is a somewhat enlarged detailed view of a portion of the structure of Figures 1 and 2;

Figure 4 is a perspective view of a portion of the structure of Figure 3;

Figures 5 and 6 are, respectively, plan and side elevational views of the novel tine structure of invention;

Figure 7 is a perspective view of a tine axle useful in conjunction with the tines of Figures 5 and 6;

Figure 8 illustrates in section one embodiment of the tine arrangement of invention;

Figure 9 is an enlarged view partially in section of a portion of the structure of Figure 8;

Figure 10 illustrates in perspective the embodiment of the arrangement of the tines of invention shown in Figure 8;

Figure 11 is an exploded view of the right hand tines of Figure 10; and

Figure 12 is a perspective view illustrating a control arrangement useful in conjunction with the apparatus of Figures 1 and 2.

Referring to the drawings there is shown in Figure 1 a walking powered tiller illustrating the relationship of the tiller tines to the power apparatus in the equipment of this invention.

Referring now particularly to Figures 1 and 2, the numeral 1 indicates a substantially horizontally extending plate-like support or mounting having forwardly thereon at 3 a usual air-cooled 4-cycle gasoline engine. The motor shaft carries pulley 5 (Figure 2) and the shaft extends longitudinally rearwardly of the support 1 thereabove. A suitable V-belt 7 extends downwardly from pulley 5 around driven pulley 9 and the support 1 is provided with a narrow laterally-extending slot 11 for the passage of the belt.

Pivotally secured to the support 1 is an arm 13 (Figures 2 and 3) which carries an idler pulley 15 and this idler in the operation of the equipment functions as a clutch and is adapted to be urged against belt 7 to occasion the tensioning of the belt and the transmission of power between the driver and the driven pulleys.

Upstanding from the rear portion of the support 1 is a rigid web 17 to which there is suitably bolted upwardly extending rearwardly diverging handles 19, 21. These handles are of a tubular structure and adjustably mounted to permit of regulation of the handle height, and for this purpose the tubular handles are flattened and apertured at their lower ends; the web 17 is provided with a single lower aperture and a row of upper apertures 22 disposed on substantially a circular arc. Suitable bolts passing through the handle ends and the web 17 retain the handles in desired supported position and the handles may be pivoted on the lower bolt to a desired adjustment before securing the upper bolt.

Also supported from the web 17 rearwardly and depending substantially vertically therefrom are a pair of ground-contacting wheels 23, 25 which are respectively supported by outwardly angled steel straps 27, 29, the wheels being journaled in the lower ends of the straps. As illustrated in Figures 1 and 2 these wheels are outwardly of the straps but when it is desired to work in narrow spacings the wheels may be positioned inwardly of the straps. Web 17 also has extending rearwardly from a lower portion thereof a hitch 31 to which an adjustable depth stake 33 is hinged.

Handle 19 (Figure 3) pivotally carries on the underside thereof a lever 35 which is substantially U-shaped in cross section and is provided at the bend thereof with a series of rearwardly extending apertures 36 (Figure 4). Clutch control rod 37 has a hook 39 which passes through two apertures of the lever and is thus adjustably connected to the lever. The lower end of rod 37 engages in an open end of spring 41, the other end of which is secured to the pivotal arm 13. Thus operation of lever 35 stresses the spring 41 and urges the idler into contact with the belt providing a constant tension thereon; release of the lever 35 permits the belt to urge the idler away to de-clutch the mechanism.

Referring briefly to Figure 12 another embodiment of this control arrangement is shown wherein the pivoted bell crank lever 42 receives the lower end of control rod 37 in one arm thereof and the other arm receives an end of spring 41; the spring 41 upon actuation of the control rod 37 provides a constant tension on the belt 7 as described in connection with Figure 3.

The handle 21 carries a throttle control 24 for the motor 3 and thus complete control of the unit is within the grasp of the operator since the handle 19 carries the clutch control.

Forwardly, beneath the support 1 (Figures 1, 2 and 8) there extends substantially horizontally a housing 43 which encloses a shaft 45 and which shaft carries the driven pulley 9 (Figure 2). Forwardly the shaft 45 is provided with a worm 47 (Figure 8) meshing with a gear 49 carried on a short laterally extending shaft 51 which passes through bosses, 50, 52 of the housing.

The horizontal housing 43 is integral with a web-like structure 53 which extends upwardly to the support 1; extending laterally from the web 53 beneath support 1 and forwardly of lateral slot 11 are oppositely disposed flanges, one of which is indicated at 54 in Figure 1. These flange means 54 curve downwardly and slightly forwardly terminating rearwardly of the tines; objects striking the same slide off readily to the ground through the spacing between the flange means and the tines as shown in Figure 2.

Shaft 51 as noted is relatively short and it lies wholly within the width of the wheels 23, 25 whether the same are inboard or outboard of their respective straps. Tines are provided on shaft 51 which in combination with the wheels support the tiller. The shaft 51 is positioned forwardly of any vertical line through the motor and is also positioned forwardly of the support 1 to provide adequate balance in the tiller. The shaft 51 is also positioned well forwardly of the flange means 54 (Figure 1) such that earth and other material thrown up by the tines in their rotation do not lodge between the flange and tine shaft. Thus the flange is a protection for the belt 7 and the driven pulley 9.

Referring now to Figures 5–8, inclusive, and initially particularly to Figure 7, a tine axle or tine detachment is shown at 55 and comprises a tubular body having a relatively long end portion 57 of large diameter, a shorter diameter end portion 59 and a juncture 61 between the end portions which tapers smoothly downwardly from the larger to the smaller diameter. Aligned apertures 63, 65 are provided in the tine axle.

Referring now to Figures 5 and 6 the platter-like tine 67 comprises a sheet metal body which is provided with a central opening 69 to receive therethrough a tine axle 55. The tine 67 is substantially a cross-iron or is cruciform in plan view having four arcuate shaped inwardly extending edges 68 from which the tine teeth 70, 71, 72 and 73 project; the tine teeth are positioned at substantially right angles to the substantially planar sheet metal body and are so arranged that one pair of diametrically opposite teeth 70, 71 extend from the sheet metal body in one direction while the other pair of diametrically opposite teeth 72, 73 extend from the tine in an opposite direction. The edges 68 curve inwardly only slightly and a pair of arcuate edges define therebetween the tine teeth as is most clearly noticeable from Figure 5. Also, as is clear from Figure 5, the arcuate edges extend in a circumferential sense around the tine and are of greater circumferential length than the tine teeth.

As most clearly seen from Figures 5 and 6 the tine teeth are formed integral with and have the bases thereof in the periphery of the sheet metal body; the edges of the teeth taper rearwardly from the leading edges indicated at A to the trailing edges indicated at B. Most suitably the angle between a tooth edge and a line passing through the center of the tine and a leading edge A is about 75 degrees. These tine teeth are relatively wide and long (Figure 10) and are most suitably four in number; a greater number of tines tends to provide an excess amount of drag on the equipment while a lesser number tends to produce vibration in operation.

To assemble a tine 67 and an axle 55 the tine is swaged onto the smaller end portion 59 of the axle and is secured at the base of the tapered juncture 61 by a weld indicated at 62 as most clearly shown in Figure 9. The taper juncture thus provides a peripheral weldment receiving portion on the axle.

Most suitably all of the tines 67 are identical as are the tine axles 55. However in order to provide for smooth equipment operation, such that the tiller moves over the ground easily, with a minimum of shock to the operator, the tines are provided on the axles in two different positions of the tines with respect to the apertures 63, 65 of the tine axle.

Preferably in the completed unit as indicated most particularly in Figures 8 and 10 the tine teeth of adjacent tines, across the whole width of the tine assemblies, are offset from each other about 45 degrees. In this connection it is of particular importance that the two tines which are positioned centrally of the apparatus on either side of the housing 43 be so arranged that their teeth strike the ground in staggered relation—that is, the teeth of the one tine are on the ground as the tooth of the other tine approaches the ground.

To provide for this staggered relationship a first combination of tine and tine axles are produced in which the tine is so welded to the axle that the pin hole apertures 63, 65 of the axle are centered on a line passing through a leading edge A of the tine and the center of the tine opening. In the second instance the pin apertures are so provided that they are offset 45 degrees from those of the first arrangement.

The structural arrangement and relationship of the tines is particularly illustrated in Figures 8–11, inclusive. Referring first to Figure 9 the boss 52 of the housing 43 receives thereover in tight fitting relation a dust cap in the form of a collar 77 welded at one end to a face of the innermost tine 67a. This tine also has welded thereto a sleeve 79 which extends through the tine aperture and receives the leftwardly extending portion of shaft 61 of the tiller. A tine axle 55b carrying tine 67b is received over the sleeve and pin hole aperture 65a thereof coincides with pin-receiving openings in the sleeve and shaft to permit headed pin 81 to be passed through the assembly; cotter pin 83 retains the assembly demountably on the shaft.

Tine 67b as most clearly seen from Figures 8, 10 and 11 has the teeth thereof offset 45 degrees from the teeth of tine 67a; similarly the tine 67c has the teeth thereof offset 45 degrees from the teeth of tine 67b and in alignment with those of tine 67a.

The tine axle 55b abuts the tine 67a leftwardly (Figure 9) and receives on the smaller diameter portion thereof the tine axle 55c carrying tine 67c (Figure 8). The headed pin 81 and cotter pin 83 provide for the retention of both tines 67a and 67b on the tiller shaft while headed pin 81' and cotter pin 83' provide for the retention of tine 67c (Figure 11).

Tines 67d, 67e and 67f on the opposite side of the housing 43 (Figure 8) are similar in structural arrangement to tines 67a, 67b and 67c, and accordingly the former will not be described in detail. However it is to be noted that the two inboard tines 67a and 67d are offset 45 degrees from each other and that the tine teeth are in a staggered relation across the width of the tiller.

In the operation of the tiller it is customary to employ a pair of tines on each side of housing 43 as indicated in Figures 1 and 2. Frequently however it is desired to add a tine on one side or on each side and the tine axle-tine combination described provides for this without the necessity of having a long lateral shaft 51. This is advantageous as it permits the unit to be manipulated close to growing products without damage thereto such as an extending shaft would occasion.

Furthermore the tines are preferably so arranged that the aligned tine teeth which strike the ground at any given instant all face in a given direction as is shown most clearly in Figure 10; this tends to provide for a minimum of vibration in the tiller as the tines then slice through the earth in unison and do not tend to buck each other.

Referring now to the operation of the structure of invention, with the motor 3 operating and the throttle controlled at 24 pressure on the member 35 carried on the handle 19 causes the belt 7 to be tensioned and power to be transmitted to the tine shaft 51. The tines rotate forwardly slicing into the earth and carry the unit also forwardly. As the unit moves forwardly the wheels 23, 25 sink into the softer earth formed by the tilling operation and the depth gauge 33, which has been preset, extends downwardly until it contacts the hard ground and limits the depth of entry of the tines into the soil. Pressure on the handles 19, 21 may also be utilized to control the depth of entry of the tines.

As the unit moves forwardly the tines slice into the ground and earth, clods, weeds and such which are picked up by the revolving forward end of the unit engage the tapered edges 68 of the tines and the material tends to be thrown off. The tines as already noted are positioned sufficiently apart from flange means 54 that material will not lodge between the tines and the flange, and the flange protects the belt and driven pulley 9 from the upwardly thrown material.

As may be most clearly noted from Figure 10 the tine teeth will strike the ground at any given instant and all face in the same direction, thus the slicing action of the wide relatively long tine teeth is exerted in one direction, reducing vibration in the unit.

Furthermore the tine teeth are so arranged that in the rotation of the tine assemblies substantially no material will clog between the tines on the tine axles.

The tines as thus described when operated in the manner set forth may enter the ground to the depth of the tine axles without stalling of the motor; such of course depends upon the general nature of the earth and the number of tines employed. With respect to the number of tines it has been found that a two horse-power motor with the arrangement described will not be stalled when a total of 10 tines, that is 5 on each side, are employed. This is considered to be due to the arcuate shape of the tine edges, which as already noted, inhibit any clogging and the broad surface afforded by the tine teeth.

In connection with the arcuate edges I have found that the curvature of these edges should be relatively shallow and smoothly contoured, for when the teeth are defined by straight or substantially radially extending edge portions, clogging occurs and the unit does not respond as well with any given power supply or engine size. In this connection it is to be noted that with a two horsepower engine driving the tine assemblies and with the assemblies so arranged that 5 tines are carried on each side of the housing, the outboard tines tend to curve ahead of the inboard tines; or more specifically a bending occurs in the aligned tubular tine axles under power applied to the unit as the outboard tines tend to walk ahead resulting in the axle curvature.

The tine arrangement is of particular value when it is desired to approach closely to the growing crops in a narrow spacing, as removal of the tines and the tine axles does not leave any protruding shaft to damage the growing vegetation.

It will be understood that this invention is susceptible to modification in order to adapt it to different usages and conditions and accordingly it is desired to comprehend such modifications within this invention as may fall within the scope of the appended claims.

I claim:

1. A tine of generally cruciform shape comprised of a substantially planar plate-like body of metal having an axial opening and peripheral tine teeth equidistant from the center of the opening and extending laterally from the body, the peripheral edges of the tine defining the tine teeth extending in a circumferential sense around the tine periphery and being of greater circumferential length than the tine teeth, said edges being inwardly arcuate and terminating at the bases of the laterally extending peripheral tine teeth.

2. A tine of generally cruciform shape comprised of a substantially planar plate-like body of metal having an axial opening and peripheral tine teeth, the tine teeth being four in number, arranged in quadrature equidistantly from the center of said opening and extending laterally from the body, the edges of the tine which define the teeth extending in a circumferential sense around the tine periphery and being of greater circumferential length than the tine teeth, said edges being each inwardly arcuate between tine teeth and terminating at the bases of the laterally extending peripheral tine teeth.

3. A tine of generally cruciform shape comprised of a substantial planar plate-like body of metal having an axial opening and peripheral tine teeth, the tine teeth being four in number, arranged in quadrature equidistantly from the center of said opening and adjacent teeth extending laterally from the body in opposite directions, the edges of the tine which define the teeth extending in a circumferential sense around the tine periphery and being of greater circumferential length than the tine teeth, said edges being each inwardly arcuate between tine teeth and terminating at the bases of the peripheral, laterally extending tine teeth.

4. A tine of generally cruciform shape comprised of a substantially planar plate-like body of metal having tine teeth integral therewith, the teeth extending laterally from the plate-like body on the periphery thereof and each tine tooth having the base of its tooth on the periphery of the plate-like body, the peripheral edges of the plate-like body being inwardly arcuate and each extending in a circumferential sense around the tine periphery from the base of one tine tooth to the base of a next tine tooth and each edge being of a greater circumferential length than the base of a tine tooth.

5. A tine of generally cruciform shape comprised of a substantially planar plate-like body of metal having an axial opening and spaced integral peripheral tine teeth extending laterally from the body, each tine tooth having a base thereof in the periphery of the body and each tooth having a leading and a trailing edge, the leading edge of each tooth being further from the center of the axial opening than the trailing edge of the same tooth, the plate-like body having inwardly arcuate peripheral edges extending in a circumferential sense around the tine and being of a greater circumferential length than the bases of the teeth, said edges joining the teeth and terminating in the bases of the teeth.

6. A tine of generally cruciform shape comprised of a plate-like substantially planar body provided with an axial opening and having tine teeth extending laterally from the periphery of the body in substantially circumferentially spaced relation, the body periphery having edge portions which extend in a circumferential sense around the tine terminating at the laterally extending teeth, the said edge portions being of greater circumferential length than the teeth and being arcuate inwardly between the teeth.

References Cited in the file of this patent

UNITED STATES PATENTS

| | | |
|---|---|---|
| 361,698 | Hodgkins | Apr. 26, 1887 |
| 814,744 | Stewart | Mar. 13, 1906 |
| 1,040,589 | Sturgiss | Oct. 8, 1912 |
| 1,740,069 | Chase | Dec. 17, 1929 |
| 2,176,261 | Kelsey | Oct. 17, 1939 |
| 2,614,474 | Merry | Oct. 21, 1952 |

FOREIGN PATENTS

| | | |
|---|---|---|
| 315,902 | Germany | Nov. 15, 1919 |
| 861,008 | France | Oct. 15, 1940 |

OTHER REFERENCES

"Triple-M," brochure of Triple-M Products Division, The Motch and Merryweather Machinery Co., Gates Mills, Ohio. Form No. 253.